Dec. 31, 1940.  W. A. EATON ET AL  2,226,660
GEAR SHIFTING MECHANISM
Filed Sept. 10, 1934  4 Sheets—Sheet 4
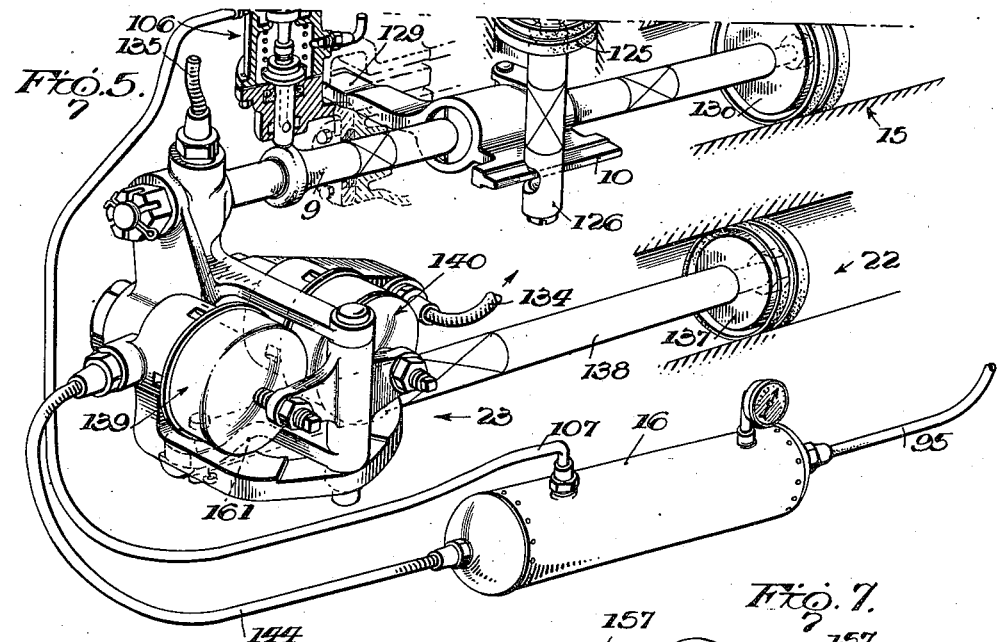
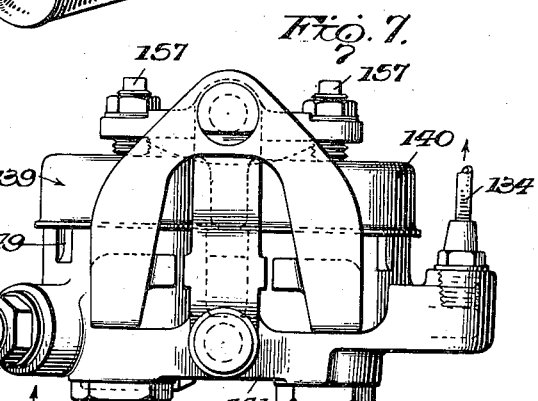
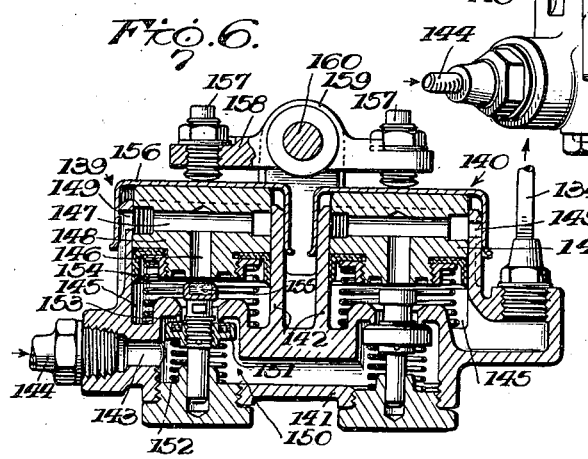
Inventors
Wilfred A. Eaton &
Roy S. Sanford
By N. D. Parker Jr.
Attorney Patented Dec. 31, 1940

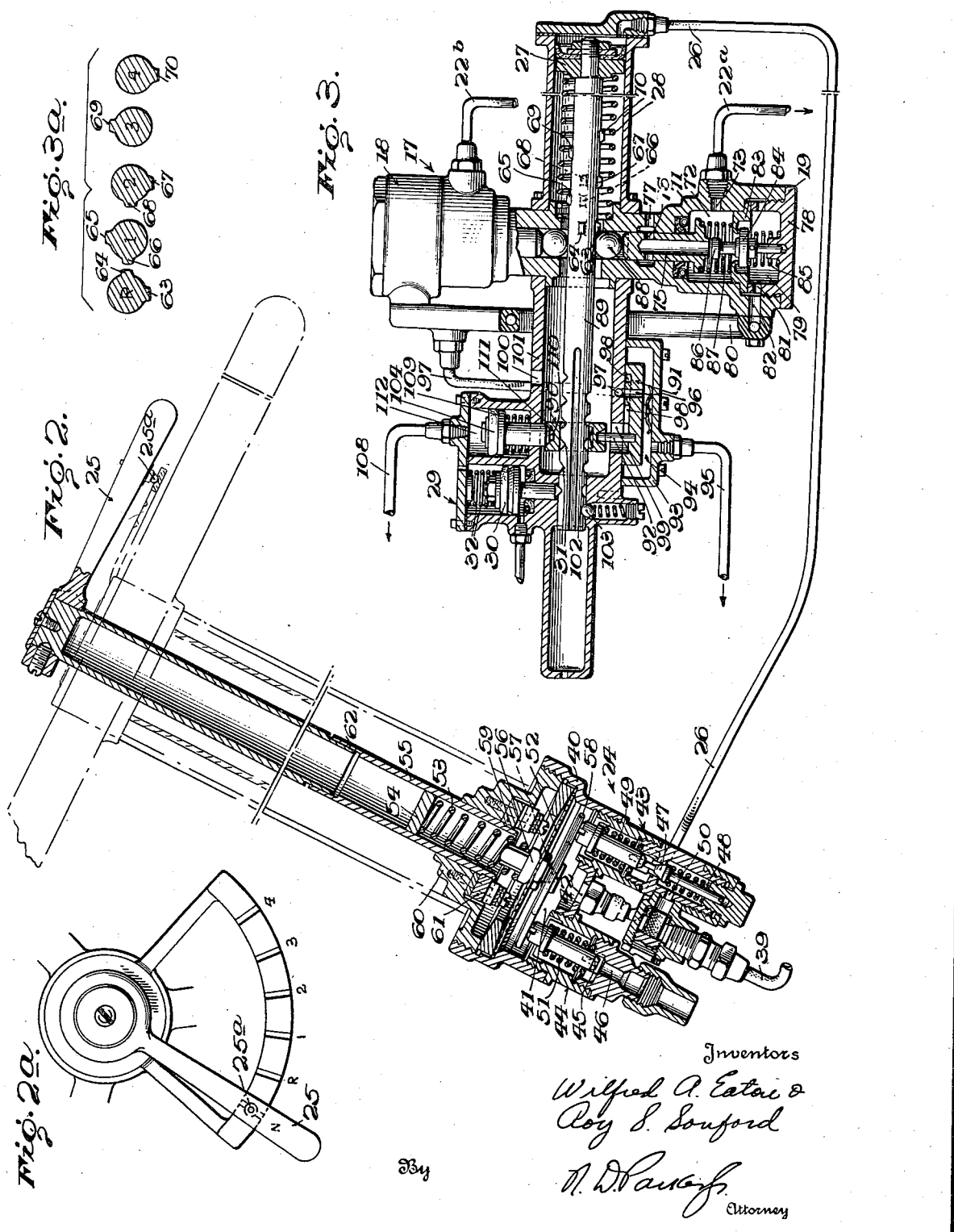

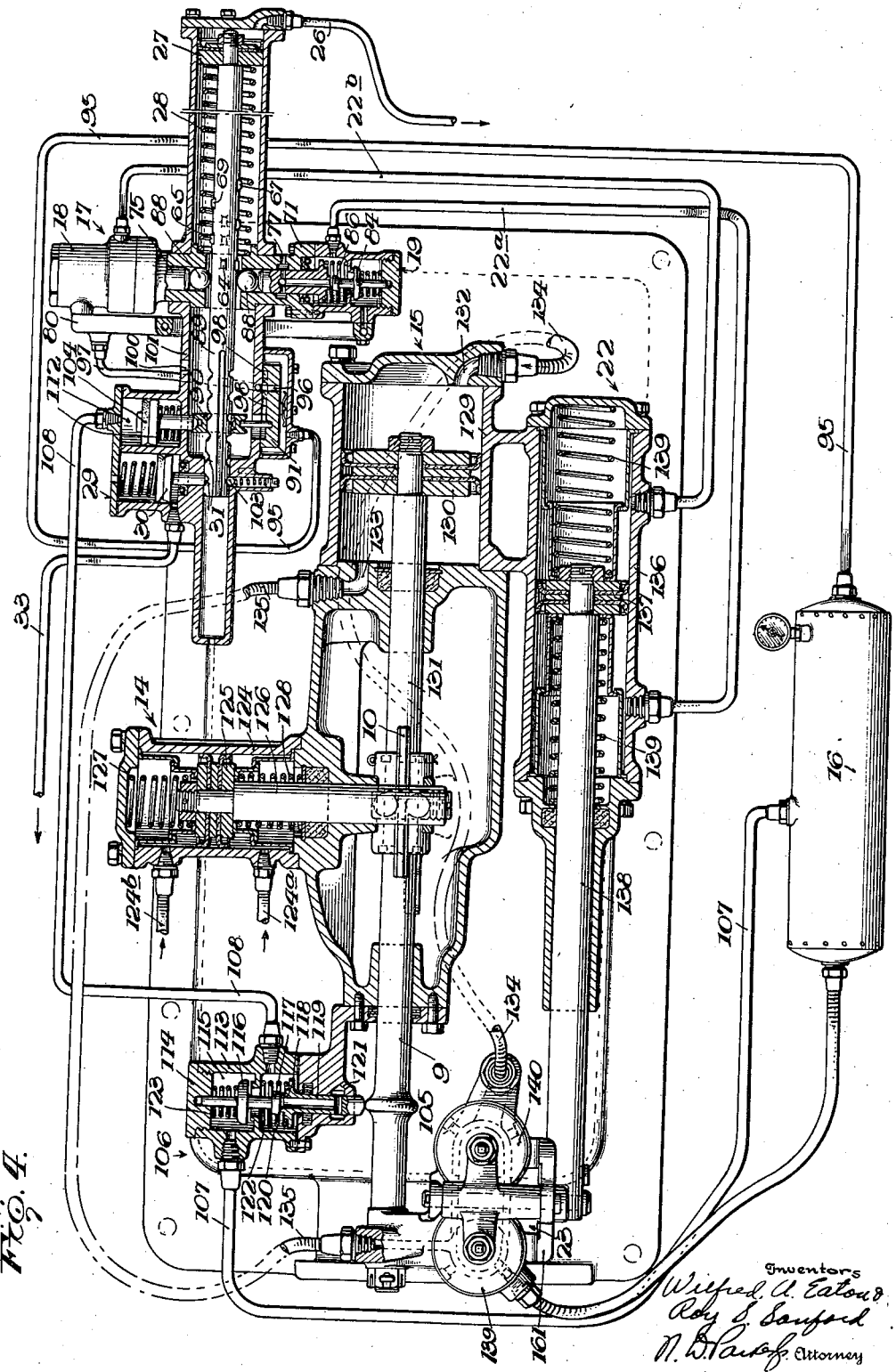

2,226,660

UNITED STATES PATENT OFFICE 2,226,660

GEAR SHIFTING MECHANISM

Wilfred A. Eaton, Pittsburgh, Pa., and Roy S. Sanford, New York, N. Y., assignors to Bendix-Westinghouse Automotive Air Brake Company, Pittsburgh, Pa., a corporation of Delaware Application September 10, 1934, Serial No. 743,474

20 Claims. (Cl. 74—334)

This invention relates to selective change-speed transmission mechanisms and more particularly to a preselective control apparatus therefor.

One of the objects of the present invention is to provide a transmission gearing control mechanism so constituted as to enable an operator to preselect a desired gear relation of the transmission while another gear relation is established, the construction being such that the establishment of a preselected gear relation is effected in a novel and efficient manner.

Another object of the invention is to provide a novel power-operated selective gear-changing transmission wherein novel control means are incorporated permitting preselection of the desired gear relation and establishment thereof upon a subsequent operation of the clutch-controlling element, thus enabling a desired gear relation to be preselected while the change-speed transmission is in another gear relation.

Still another object is to provide, in a mechanism of the above character, a novel preselective controlling mechanism manually operable in such a manner as to control the application of fluid power to the gear-changing device.

A further object is to provide, in a power-operated preselective gear-changing mechanism of the above type, a novel preselective controlling element constituted in such a manner as to necessitate a single power-transmitting connection only to the devices controlling the application of power to the gear-changing members.

A still further object is to provide a preselective gear-changing mechanism whereby operation of the clutch controlling element will not disturb the gear relation established and corresponding to the preselected relation.

Other objects and novel features of the invention will appear more fully hereinafter from the following detailed description when considered in connection with the accompanying drawings, wherein one embodiment of the invention is illustrated. It is to be expressly understood, however, that the drawings are for purposes of illustration only and are not designed as a definition of the limits of the invention, reference being had for this purpose to the appended claims.

In the drawings, wherein similar reference characters refer to similar parts throughout the several views:

Fig. 2 is a sectional view of the manually-operable preselective control device;

Fig. 2a is a plan view of the manually-operable control device;

Fig. 3 is a side view, partly in section, of the master-controlling valve;

Fig. 3a is a diagrammatic view of the cams provided in the control element of the master-controlling valve;

Fig. 4 is a sectional plan view of the power control mechanism of the present invention illustrating the same associated with a selective change-speed transmission;

Fig. 5 is a perspective view of the main shifter bar of the transmission and the power-operated devices associated therewith;

Fig. 6 is a sectional view of a control valve mechanism employed with the present invention;

Fig. 7 is a side view of the valve mechanism of Fig. 6, and

Fig. 8 is a plan view of a modified construction of the selector element.

Figure 1:
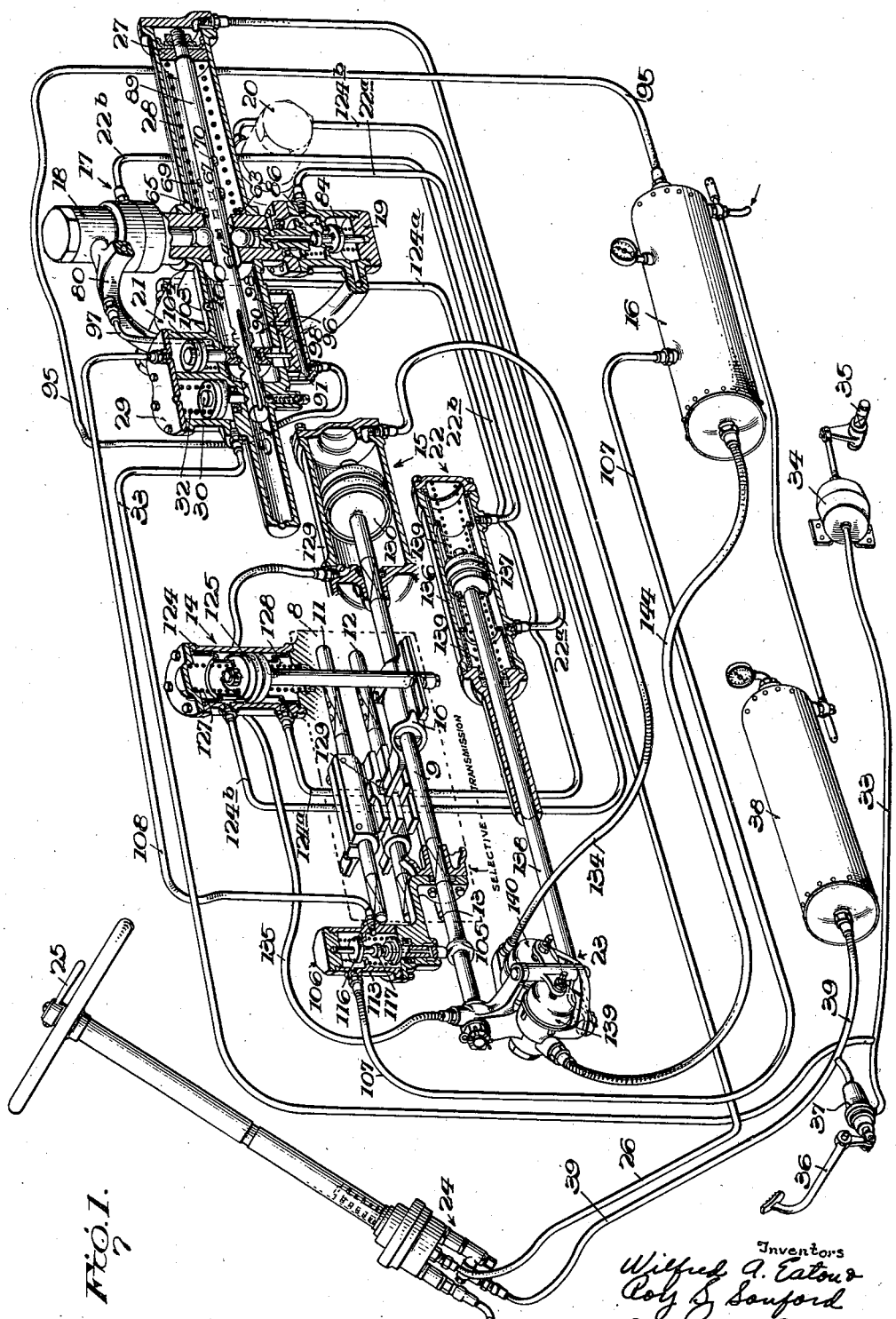
Fig. 1 is a diagrammatic view having certain parts in section, of a gear-shifting control mechanism constructed in accordance with the principles of the present invention.

Referring more particularly to Fig. 1, a transmission control device embodying the principles of the present invention is illustrated therein in connection with a selective change-speed transmission gearing mechanism 8 of any suitable type employing shiftable members for changing the gear ratio between a driving and a driven shaft. As shown, such mechanism may be provided with a main shifter bar or rail 9 carrying shifter member 10, which latter is adapted to select and move, in a longitudinal direction, one of a plurality of auxiliary shifter bars 11, 12 or 13 to effect a desired gear relation. A power device 14 is provided for moving the shifting member 10 laterally in opposite directions to select either of the shifter bars 11 or 13, and a second power device 15 is employed for moving the said member and selected shifter bar longitudinally, and these power devices are preferably operated by a fluid pressure differential. As shown, the said devices are operated by air under pressure from reservoir 16 in a manner which will appear more fully hereinafter, it being understood, however, that the fluid means herein disclosed has been shown by way of example only and that any suitable fluid may be utilized.

Control means are provided by the present invention for controlling the flow of fluid under pressure to the power devices 14 and 15 for effecting a remote control of the operation of said devices and in such a manner that a desired gear relation may be preselected while another gear relation is established. As shown, such control means include a master control valve mechanism 17 having four similar valves 18, 19, 20 and 21, valves 18 and 19 being provided for controlling the flow of fluid to the power device 15, while valves 20 and 21 are adapted to control the flow of fluid power to the device 14. In the form of the invention illustrated, the valves 20 and 21 admit fluid power directly to either end of power device 14, while valves 18 and 19 when operated serve to admit fluid pressure to either end of a fluid pressure-operated relay or pilot device 22, operation of the latter serving to control the functioning of a valve mechanism 23, the latter preferably being of the follow-up type and having cooperating portions connected with the movable element of the relay 22 and the main shifter bar 9 respectively, the construction being such that when the valve 23 is operated to admit fluid under pressure to the device 15, operation of the latter will effect a lapping of the valve mechanism and an interruption of the flow of power fluid. In this manner, the movement of the main shifter bar may be readily controlled in a manner proportional to the extent of longitudinal movement of the movable element of the fluid pressure-operated relay 22.

In order that the operation of the valve mechanism 17 may be remotely controlled by the operator in such a manner that preselection of a desired gear ratio may be effected, an operator-controlled selective valve mechanism 24 is provided which when manually operated by the selector lever or handle 25 serves to transmit to the valve mechanism 17 through conduit 26, a predetermined fluid pressure differential which varies in accordance with the desired gear relation. Such fluid pressure differential is supplied to a pressure-responsive control or selector piston 27 which is opposed in its pressure-responsive movement by a graduated spring 28, the construction being such that when selector 27 is permitted to move, the predetermined pressure differential supplied thereto will move the same a predetermined amount. Suitable cams carried by the element 27 are provided for operating the valves 18, 19, 20 and 21, these cams being more fully disclosed in Figs. 3 and 3a and referred to more particularly hereinafter.

One of the features of the present invention resides in the provision of means for normally preventing movement of the control selector 27 and consequent operation of the valves 18 to 21 until release of the engine clutch so that a preselection of the desired gear relation may be effected while one gear relation is established and thereafter, operation of the master control valve is permitted only upon disengagement of the engine clutch. For this purpose, a fluid pressure-operated detent 29 is provided having a detent element 30 normally engaging one of a plurality of notches 31 provided in the selector 27. As shown in Fig. 1, a spring 32 normally maintains the detent in latched position. A clutch-controlling fluid conduit 33 communicates with the fluid pressure-operated detent in such a manner that when fluid pressure is admitted to the conduit, the detent 30 is moved out of engagement with respect to the notch 31, thus permitting movement of the selector element 27 in either direction. Preferably the clutch-controlling line 33 communicates with a clutch-operating fluid motor 34 operatively connected with the clutch-controlling shaft 35, admission of fluid to the motor and the line 33 being governed by manual operation of the clutch-controlling pedal 36 which, through a suitable valve mechanism 37, controls the admission of fluid under pressure from reservoir 38 through conduit 39 to said line 33.

With the above brief general description of the main constituent parts of the control mechanism constituting the present invention, reference will now be had to the remaining figures illustrating the various parts of the system more in detail. Referring more particularly to Fig. 2, the manually-operable selective controlling valve mechanism 24 comprises a casing 40 defining a chamber 41, the latter communicating with conduit 26 through port 42. The casing 40 carries intake and exhaust valve assemblies 43 and 44 respectively, the latter comprising a normally open exhaust valve 45 which normally vents the chamber 41 to atmosphere via duct 46. The intake valve assembly comprises a normally closed intake valve element 47 which normally serves to interrupt communication between conduit 39 and the chamber 41, the said valve when opened, however, against the tension of springs 48 and 49, serving to establish communication between conduit 39 and chamber 41 through duct 50 and past the valve element 47. As shown, the exhaust valve 45 is normally urged to open position as by means of a spring 51, the strength of which is less than the combined strength of springs 48 and 49 for a purpose which will appear more fully hereinafter.

In order to manually operate the valve mechanism 24 in such a manner that a predetermined movement of the actuator handle 25 to select a desired gear relation will admit a predetermined pressure to the conduit 26, a flexible diaphragm 52 closes off the top of the chamber 41 and the application of manual force to said diaphragm is transmitted through a spring 53. As shown, one end of the last mentioned spring bears against an abutment 54 carried by the manually-operable shaft 55 while the lower end of said spring bears against the diaphragm-carried member 56, the latter being provided with a conically-shaped portion 57 within the chamber 41 adapted to cooperate with a valve-actuating plate 58. In order to convert rotary movement of the shaft 55 into longitudinal movement thereof for operation of the plate 58, a ring-shaped cam member 59 is secured in cap member 60 for cooperation with suitable cam surfaces 61 provided on the lower portion of the shaft 55. With the above construction, it will be observed that rotation of the shaft 55 will, through the cooperating cam surfaces 61 and 59, move the lower portion of the shaft downwardly, this being permitted by the use of a suitable slip joint 62 in the manually-operable shaft, to compress spring 53 and effect downward movement of diaphragm 52 and valve-actuating plate 58. Since the combined resistance of springs 48 and 49 associated with the intake valve is greater than that of spring 51, downward movement of the valve-actuating plate 58 will effect first a closure of the exhaust valve 45. Further movement of the diaphragm, however, rocks the plate 58 with the exhaust valve stem acting as a fulcrum, so as to open the intake valve 47 to admit fluid under pressure to chamber 41 and beneath the diaphragm 52, such fluid being conducted through conduit 26 to the selector element 27. When the pressure in chamber 41 acting on the diaphragm 52 slightly exceeds the opposing pressure exerted by the spring 53, the diaphragm will be moved upwardly, so as to permit the valve 47 to be closed by the spring 48. Under these conditions, both intake and exhaust valves will be closed or lapped and the parts will remain in this position, so long as the tension of spring 53 is maintained at the supposed value. It will thus be seen that a predetermined pressure differential is supplied the selector element 27 through conduit 26. In the event that a different gear relation is desired to be selected, an additional movement of the control lever 25 exerts an additional pressure upon spring 53 whereupon the above operation will be repeated and an additional increment of pressure supplied to the control element 27 until the valve mechanism is again lapped. Preferably the increments of pressure are of fifteen pound intervals for example, since it has been found that with present installations such pressure increments will operate satisfactorily. It will be further readily understood that with the above described control valve arrangement, such pressure increments may be readily controlled by providing suitable detent mechanism in connection with the controlling member 25 such as is shown at 25a in Figs. 2 and 2a.

As pointed out above, the selector element 27 is provided with suitable cams for operating valves 18 to 21, and referring more particularly to Fig. 3, such cams are shown therein at 63, 64, 65, 66, 67, 68, 69 and 70. These cams, as shown more particularly in Fig. 3a, are suitably staggered with respect to the control element for the purpose of operating the proper combination of valves 18 to 21, and reference will be had thereto more particularly hereinafter. Each of the valves 18 to 21 is of similar construction and a description of valve 19 shown in section in Fig. 3, it is believed, will suffice for an understanding of the remaining valves. As shown therein, the valve 19 includes a casing 71 forming a chamber 72 communicating through a port 73 with a conduit 22a and also communicating with the atmosphere through a hollow reciprocating valve-operating element 75 and ports 76, 77. The valve is also provided with a cap 78 forming with the casing 71 an intake chamber 79, the latter communicating with an intake manifold 80 through aligned ports 81 and 82. The cap 78 maintains in position an intake valve seat 83 which cooperates with an intake valve 84, the latter being normally urged as by means of a spring 85 to said seat. Preferably, the intake valve 84 has integrally formed therewith an exhaust valve 86 which is normally spaced from the hollow member 75 to permit communication between the chamber 72 and the atmosphere as mentioned above, such spacing being effected by means of a spring 87 which normally urges the member 75 to the position shown. A suitable ball bearing 88 is in constant contact with the rod 89 forming a portion of the selector control element 27 and with the other end of member 75, said bearing being adapted to cooperate with cams 63, 67 and 70 in order to move the member 75 downwardly to close off the exhaust valve 86 and thereafter open the intake valve 84, thus establishing communication between the intake manifold 80 and the conduit 22a. Normally, however, as will be observed from Fig. 3, when bearing 88 is not actuated by any of the cams, the conduit 22a will communicate with the atmosphere through the connections aforementioned.

It will be observed from Figs. 1 and 3 that cams 63 and 64 operate valves 19 and 20, cams 65 and 66 operate valves 18 and 21, cams 67 and 68 operate valves 19 and 21, cam 69 operates valve 18, while cam 70 operates valve 19. These various cam combinations are preferably so spaced along the rod 89 of the control element 27 as to permit contact of the valve actuating bearings 88 with the rod during each movement from one cam combination to another, thus insuring rapid exhausting of pressure from the various valve chambers 72 after each successive actuation of the valves by the various cam combinations. As will appear more fully hereinafter, the exhausting of the valves 18 to 21 permits a neutralization of the gear relations and such neutralization is availed of to admit fluid under pressure to the intake manifold 80.

Referring more particularly to Figs. 1, 3 and 4, one end of the rod 89 of the selector element 27 frictionally carries a valve-actuating element 90 which is secured to a slide valve 91 as by means of a pin 92. As shown, the slide valve 91 is contained within a housing 93, the latter providing a chamber 94 which is in constant communication with a conduit 95 which in turn is connected with reservoir 16. The valve 91 is also provided with a duct 96 which, in the position shown in Fig. 3, communicates with a conduit 97 connected with the intake manifold 80. Disposed upon either side of the duct 96 are exhaust ducts 98 which communicate with each other and with slot 99 which is in constant communication with the atmosphere through port 100 provided in the casing 101 spaced from but surrounding the rod 89 of the selector element. This last named rod, as shown, may be provided with a plurality of recesses 102 for reception of a suitable resiliently-urged ball detent 103, the latter being provided for releasably maintaining the selector element in any particular position to which it has been moved in response to fluid pressure applied thereto. From the above construction, it will be observed that with the parts in neutral position, the slide valve 91 establishes communication between the intake manifold 80 and the reservoir 16 through conduit 95. Thus, fluid under pressure will be available in the intake manifold for admission to the various valves 18 to 21 for effecting a desired gear change in response to the admission of a predetermined pressure to the selector element 27.

In order that the gear-shifting relations may be effectively neutralized during each shift and to provide means whereby fluid under pressure will be conducted to the master controlling valve 17, when the gear shift is in neutralized position in order to effect the preselected shift, a cam detent 104, Fig. 3, is provided which cooperates with the valve-actuating element 90 to return the latter to the position shown only in the event that the main shifter bar 9 is in neutral position. When in such position, a cam 105 carried by the main shifter bar, Figs. 1 and 4, serves to actuate valve mechanism 106 in such a manner as to supply fluid under pressure from reservoir 16 through conduits 107 and 108 to the cam detent 104, to cause downward movement thereof in opposition to the tension of spring 109 to cam member 90 back to the position shown in Fig. 3. In order to effect this action, the lower portion of member 104 is formed as a cam 110 adapted to cooperate with cam surface 111 formed on the element 90. In the event that the gear-shifting mechanism is not in neutral position, fluid under pressure is exhausted from chamber 112 of the cam detent mechanism 104 and the spring 109 is effective to move the latter to such a position that the cam 110 is withdrawn from contact with surface 111. Thus since the element 90 is frictionally carried by the rod 89, the said element is free to move with the rod until the gear shift is returned to neutral position, whereupon the aforementioned camming action between 110 and 111 is again effected to cause a return of the member 90 to the position shown in Fig. 3. Flow of fluid under pressure will then be reestablished between reservoir 16 and the manifold 80.

Referring more particularly to Figs. 1 and 4, the valve mechanism 106 comprises a casing 113 having a cap 114 which together define an intake chamber 115 housing an intake valve 116, the latter being preferably formed integrally with an exhaust valve 117. The latter is adapted to cooperate with an exhaust valve seat 118 formed on a hollow member 119 which, when the gear shift is in a position other than neutral, connects an exhaust chamber 120 with the atmosphere through restricted port 121. As shown, Fig. 4, member 119 is resiliently urged as by means of spring 122 into engagement with the cam 105 carried by the main shifter bar 9, while the combined intake and exhaust valves 116 and 117 are normally urged downwardly as by means of a spring 123. However, with the main shifter bar in neutral position, the cam 105 effects a closure of the exhaust valve 117 and an opening of intake valve 116 in order to establish communication between the reservoir 16 through conduit 107, chamber 115 and conduit 108 and the chamber 112 for the purpose of effecting engagement between the cam detent 104 and the valve-actuating element 90.

The power device 14, heretofore described as effecting lateral movement of the shifting member 10, is preferably of the double-acting type and includes a cylinder 124 housing a piston 125, Figs. 1 and 4. The latter has connected thereto a suitable piston rod 126, the lower extremity of which is suitably connected to the shifting member 10 in such a manner that longitudinal movement of the piston rod will effect oscillation of the member 10 while permitting the latter to be moved transversely of the piston rod 126 in a substantially frictionless manner. Preferably a pair of precompressed springs 127 and 128 are disposed upon either side of the piston 125 in order to bring the latter to a central position in the cylinder upon exhaustion of fluid pressure from either side thereof, this movement positioning the shifting member 10 also in a central or neutral position wherein the end portion 129 thereof, Fig. 5, is positioned midway between the outermost auxiliary shifter bars 11 and 13 and in engagement with the central auxiliary shifter bar 12.

From the above description of the power device 14, it will be understood that the parts normally occupy the positions shown in Figs. 1, 4 and 5 wherein the shifting member 10 is neutralized and the end portion 129 thereof is in engagement with the intermediate auxiliary shifter bar 12. Upon admission of fluid under pressure to the lower side of cylinder 124, for example, through conduit 124a by operation of the valve mechanisms 24 and 21, the shifting member 15 will be moved laterally to effect selection of the auxiliary shifter bar 13, while fluid under pressure admitted to the upper part of cylinder 124 through conduit 124b would have caused the shifting member 10 to have selected the auxiliary bar 11. After exhaust of fluid under pressure from either side of the cylinder, however, the resilient means 127 and 128 will immediately return the shifting member 10 to neutral position. In the transmission mechanism disclosed, it has been assumed for purpose of illustration that the shifter bar 13 and its reciprocating movement to the left and right, Fig. 1, will effect engagement of first and second gear respectively, while corresponding reciprocating movements of the auxiliary shifter bar 12 will effect engagement of third and fourth speeds respectively. Reciprocation of the auxiliary shifter bar 11 to the right, Fig. 1, will cause engagement of the reverse gear, these elements corresponding to the gear changes in a well known commercial type of selective transmission. These elements, however, are for the purpose of illustration only, it being understood that the invention is equally well applicable to selective transmissions involving other speed-changing combinations.

Fluid under pressure is not only admitted to the power device 14 to select the desired auxiliary shifter bar as set forth above, but is also admitted to the power device 15 to control longitudinal movement of the shifting member 10 and the selected shifter bar to effect the desired gear relation. Referring to Figs. 1 and 4, the power device 15 comprises a double-acting cylinder 129 having a piston 130 therein provided with a piston rod 131, which latter is extended to form the main shifter bar 9 and on which the shifting member 10 is mounted in such a manner as to be rotatable about said rod but longitudinally movable therewith. Upon either side of the piston 130, cylinder 129 is provided with openings 132 and 133 communicating with valve mechanism 23 through suitable conduits 134 and 135 respectively.

Preferably, as heretofore stated, the flow of fluid pressure to the power device 15 is controlled by a fluid pressure-operated pilot or relay device 22, and, as shown, Figs. 1 and 4, such relay is constituted by a double-acting cylinder 136 having a reciprocating piston 137 therein to which is secured a piston rod 138. The piston 137 is preferably resiliently biased to central position by means of precompressed springs 139a in order that the said piston may be immediately returned to central or neutral position upon exhaustion of fluid under pressure from either side thereof. The control of fluid under pressure to the relay or pilot device is effected, as above set forth, by means of valves 18 and 19 forming a part of the master controlling valve 17 and the construction of the parts is such that admission of fluid pressure to either end of the relay through conduits 22a or 22b will effect longitudinal movement of piston rod 138 and consequent operation of the valve mechanism 23 associated therewith to control the flow of fluid under pressure to the power device 15 in a manner which will appear more fully from the following:

As stated above, the follow-up valve mechanism 23 is formed with cooperating elements carried by the main shifter bar 9 and the piston rod 138 of the relay 22 respectively in order that the movements of the former may be readily controlled by relative movement between these two elements to effect an accurate control of the degree of pressure and hence the extent of movement of the pressure device 15. To this end, the valve mechanism 23 comprises a pair of similarly-constructed valves 139 and 140, Fig. 6, each being housed within the casing 141 rigidly secured to the free end of the main shifter bar 9, see Fig. 5. The casing 141 is provided with a pair of wells 142 for receiving the valves 139 and 140, the casing being provided with an inlet opening 143 communicating through a suitable conduit 144 with the reservoir 16 for conducting fluid under pressure from said reservoir to the valve mechanism. Outlet chambers 145 normally open to the atmosphere through ducts 146 and 147 are provided in pistons 148. The last named duct normally communicates with the atmosphere through ports 149 positioned in the side wall of the wells 142. The combined intake and exhaust valve structure 150 having an intake valve element 151 is normally resiliently urged as by means of a spring 152, to such a position that the intake valve contacts the seat 153 formed in the casing 141 to close off communication between the chamber 145 and opening 143. The pistons 148 are normally biased to the position shown by means of springs 154 which maintain said pistons spaced from the exhaust valve element 155. Each of the pistons 148 is provided with a suitable dust cover 156 in constant engagement with actuating screws 157 carried by arms 158 of a valve-applying rocking lever 159, the latter being suitably journaled upon a pivot pin 160 carried by the casing 141 and having an arm 161 formed integrally therewith and connected in any suitable manner to the free end of the relay piston rod 138, Figs. 4 and 5. From this construction, it will be readily observed that movement of the relay piston rod 138 in either direction will, through arm 161, rock member 159 to operate one or the other of the valves 139 and 140 for effecting closure of the exhaust valve 155 and opening of the intake valve 151, thereby permitting fluid under pressure to be conducted from the reservoir 16 through conduit 144 to the proper chamber 145. In the case of valve 139, chamber 145 is connected through the conduit 135 to the left hand end of the power device, 15 Fig. 4, while in the case of valve 140, the chamber 145 communicates with the right hand end of said power device through conduit 134. In either event, that is upon actuation of either of the said valve elements, as soon as fluid under pressure has been conducted to the power device 15, the piston 130 and main shifter bar 9 move in the desired direction and move the valve casing 141 in a manner to effect a lapping of the operated valve. As soon as the said valve has become lapped, further movement of the piston 130 will be arrested until additional fluid under pressure has been admitted to the relay 22 to again effect operation of the desired valve mechanism, it being pointed out that longitudinal movement of each auxiliary shifter bar may be resisted by means of suitable well known spring detent devices, not shown. Thus the piston 130 follows every movement of the relay piston 137, the latter thereby exercising an accurate positioning control over the former.

From the above description, with the parts in the neutral position disclosed, if it is desired to shift into reverse gear, the operator merely moves the controlling handle 25 to the reverse position, Fig. 2a, to permit the first increment of pressure to be admitted to the conduit 26 through the valve mechanism 24 in the manner heretofore described, such pressure being ineffective, however, to move the selector member 27, due to the releasable latch device 30 engaging one of the notches 31 of the selector member. Subsequent depression of the clutch-controlling element 36, however, will not only serve to connect reservoir 38 to the clutch-disengaging device 34 through conduit 39, valve 37 and conduit 33, but will also conduct fluid from the said reservoir to the latch device 29 in order to release the element 30 thereof from latching engagement with respect to the selector member 27. The latter is then free to move to the left, see Figs. 1 and 3, a distance determined by the pressure in line 26 acting upon the member 27 in opposition to the effect of spring 28, such distance being sufficient to enable cams 63 and 64 to operate valves 19 and 20. It will be observed that during the aforesaid movement of the selector member 27, the rod 89 thereof slides through the valve-actuating element 90, the latter being securely maintained in position by the detent 104 which is supplied by fluid under pressure from the neutralizing valve device 106. Thus, fluid under pressure is supplied through conduit 95, slide valve 91 and conduit 97 to the manifold 80, thus furnishing a source of fluid power which, when valves 19 and 20 are operated as outlined above, will flow through conduits 22a and 124b respectively to the left-hand portion of the relay device 22 and the top portion of the power device 14. Operation of this latter device will oscillate the shifting member 10 in such a manner that the end 129 thereof selects the shifter bar 11. Operation of the relay device 22 effects a control of the valve 139 of the valve mechanism 23 in order to admit fluid under pressure from reservoir 16 through conduit 144, valve 139 and conduit 135 to the left-hand portion of the power device 15, whereupon movement of the piston 130 of the latter will, through the member 10, move the shifter bar 11 to the right as viewed in Fig. 1 in order to establish the reverse gear relation.

During the above described operation, it will be noted that as soon as the cam 105 moves out of engagement with respect to the actuating member 119 of the neutralizing valve 106, due to longitudinal movement of the main shifter bar 9, the said neutralizing valve will exhaust the conduit 108 and the spring 109 associated with the detent 104 will be effective to move the latter upwardly out of engagement with respect to the valve-actuating element 90. Thus, with the transmission in reverse gear, the member 90 is free to move with the selector element 27, the latter, however, being maintained in position by means of the spring detent 103 and the clutch control detent 30, which latter is moved to engaging position upon exhausting valve 37 when the clutch-controlling element is returned to normal position.

In order to thereafter establish first gear relation for example, the controlling handle 25 is rotated to first position in order to operate valve mechanism 24 in such a manner as to admit a further pressure increment to the master-controlling valve mechanism 17 through conduit 26. As in the case of shifting to reverse, no control of the master valve mechanism will be effected until depression of the clutch-controlling element 36 to release the detent 30. As soon as this occurs, the selector element 27 will be moved further to the left in response to the additional pressure supplied thereto and will carry with it the valve-controlling member 90, which moves the slide valve 91 to such a position that the manifold 80 will be exhausted through the conduit 97, exhaust ports 98, chamber 99 and port 100. In the event that the above occurs prior to the disengagement between the cams 63, 64 and the valve-actuating bearings 88, intake valve elements 84 of valves 19 and 20 will be open and fluid pressure will thereupon be exhausted from the power device 14 and the fluid pressure relay 22 through the said valves via the chambers 72 and 79 which communicate with the manifold 80. On the other hand, should the cams 63, 64 have moved out of engagement with the bearings 88, the springs 87 and 85 of the valves 19 and 20 will be effective to open the chambers 72 to atmosphere and to close the intake valve elements 84, thus effecting an exhaust of device 14 and relay 22 through the respective valves, hollow member 75 and ports 76, 77. It will be readily understood that upon exhausting of the fluid pressure relay 22, the piston 137 thereof will center itself and, in so doing, will open the valve 139 to exhaust and effect operation of valve 140 of the valve mechanism 23 in order to supply fluid under pressure from the reservoir 16 through conduits 144 and 134 to the right-hand portion of the power device 15, thereby returning the same to central position, at which time the springs 128 associated with the piston 125 of the power device 14 will be effective to return the seselector member 10 to neutral position. As soon as such neutralization of the gear relations has been effected, the cam 105 on the main shifter bar 9 operates the neutralizing valve 106 to again establish a flow of fluid under pressure from the reservoir 16 to the cam detent 104 through conduits 107 and 108, the downward movement of the said detent returning the element 90 to the position shown in Fig. 3, due to the camming action between surfaces 110 and 111, thus reestablishing the flow of fluid under pressure from the reservoir 16 to the manifold 80 through conduit 95, valve 91 and conduit 97. At this time, the selector member 27 has been moved sufficiently, by the additional pressure supplied thereto, in order to bring cams 65 and 66 into engagement with valve actuating bearings 88 of the valves 18 and 21 respectively to effect operation of such valves and establish a flow of fluid under pressure through the conduits 22b and 124a to the righthand portion of relay 22 and the lower portion of the power device 14. It will be readily understood that when this operation takes place, the said power device will move the selector member 10 to select the auxiliary shifter bar 13 while the relay 22 will control the flow of fluid under pressure to the right-hand portion of power device 15 through operation of the valve 140 of the valve mechanism 23. Thus, first gear relation will be established in a preselective manner, the only operations necessary on the part of the operator being the proper movement of the control handle 25 and subsequent depression of the clutch pedal element 36 at any time when establishment of the selected shift is desired.

A preselection of any desired gear relation may be effected from any gear relation established, it being only necessary to move the controlling handle 25 to the gear relation desired and depress the clutch-controlling element 36 when the preselected gear relation is to be effected.

The construction is such, however, that after establishment of a selected gear relation, successive operations of the clutch controlling element will not effect a neutralization or other change in such relation, except in the event that another gear ratio is preselected by manipulation of the control handle 25 as stated heretofore. It will be readily perceived that upon failure of the supply of fluid under pressure, the gear-selecting member 10 will be returned to neutral position in view of the use of the precompressed springs associated with the power device 14 and the fluid pressure relay 22.

In certain instances it may be desirable to so arrange the valve mechanism 17 as to secure a sequential operation of the various valves thereof to the end that the power device 14 will receive power prior to the relay 22, as for example in shifting from neutral to a desired gear relation. An arrangement effecting this result is shown in Fig. 8, wherein the cams 164, 166 and 168 controlling the valves 20 and 21 for the power device 14 are longer than the cams 163, 165, 167, 169 and 170 which control the valves 18 and 19. It will be readily understood that with this construction the first named cams will operate their respective valves prior to the operation of the valves controlled by the second named group of cams, and hence power fluid will be admitted to the power device 14 before admission to the relay 22.

What is claimed is:

1. In a gear shifting mechanism having a member movable to select and establish different gear relations, fluid means for operating said member, means for controlling said fluid means, and a valve mechanism operable to select and supply one of a plurality of predetermined fluid pressure differentials to said controlling means depending upon the gear relation desired.

2. In a preselective gear shifting mechanism having a member movable to select and establish different gear relations, fluid means for operating said member, means for controlling said fluid means, and means for preselecting any other gear relation while one gear relation is established, said preselecting means including a valve mechanism operable to supply said controlling means with one of a plurality of predetermined fluid pressure differentials depending upon the gear relation desired.

3. In a gear shifting mechanism having a plurality of members movable to establish different gear relations, means for selecting and moving any one of said members to establish a desired gear relation, control means for said last named means, and means for preselecting a desired gear relation while another gear relation is established comprising a valve mechanism supplying said control means with fluid power, the pressure of which is dependent upon the gear relation desired.

4. In a gear shifting mechanism having a plurality of members movable to establish different gear relations, fluid-operated means for selecting and moving any one of said members to establish a desired gear relation, control means for said last named means, and means for supplying to said control means one of a plurality of predetermined fluid pressure differentials dependent upon the gear relation desired.

5. In combination with a vehicle gear shifting mechanism having a plurality of members movable to establish different gear relations, a clutch, a clutch-controlling element, fluid-operated means for selecting and moving any one of said members to establish a desired gear relation, control means for said last named means, means for supplying fluid under pressure in predetermined steps to said control means, means for normally preventing operation of said control means, and means operated by said clutch-controlling element when moved in one direction for rendering said preventing means inoperative whereby the control means operates in accordance with the fluid under pressure supplied thereto in said predetermined steps.

6. In combination with a vehicle gear shifting mechanism having a plurality of members movable to establish different gear relations, a fluid pressure-operated clutch, a control element operable to control the passage of fluid to effect disengagement and engagement of said clutch, fluid-operated means for selecting and moving any one of said members to establish a desired gear relation, valvular control means for said last named means, means for preselecting a desired gear relation while another gear relation is established including a valve effective to supply said control means with fluid power, the pressure of which is dependent upon the gear relation preselected, means for normally preventing operation of said control means, and means controlled by movement of said element to render said preventing means inoperative.

7. In a gear shifting mechanism having a plurality of members movable to establish different gear relations, power means for selecting and moving any one of said members, preselective control means for said power means operable to preselect a desired gear relation while another gear relation is established, and connections between the power means and the control means including valve means for supplying energy to said control means in variable amounts dependent upon the gear relation preselected.

8. In a gear shifting mechanism having a plurality of members movable to establish different gear relations, fluid-operated means for selecting and moving any one of said members to establish a desired gear relation, control means for said last named means, and means including a single connection to said control means for supplying a variable fluid pressure to the latter depending upon the gear relation desired.

9. In a motor vehicle gear shifting mechanism having a member oscillatable to select and shiftable to establish different gear relations, power means for oscillating and shifting said member to establish a desired gear relation, means for controlling the application of power to said power means, a rectilinearly movable fluid pressure operated control element for said controlling means, and manually operable means for supplying said control element with a different fluid pressure for each desired gear relation.

10. In a preselective gear shifting mechanism having a member movable to select and establish different gear relations, power-operated means for moving said member, preselective control means for said last named means including mechanism for moving said member to neutralize the gear relations prior to the establishment of another preselected relation, and means operated by movement of said member only when said neutralization has been effected to supply power to said first named means.

11. In a vehicle controlling apparatus having a gear shifting mechanism and a clutch-controlling element, a member associated with said mechanism and movable to select and establish different gear relations, power-operated means for moving said member, means movable to preselect a desired gear relation while another gear relation is established, means controlled by said clutch-controlling element and said movable means for effecting a neutralization of the gear relation established, and means operable when said neutralization has been effected to supply power to said power-operated means for moving the member to establish the preselected gear relation.

12. In a preselective gear shifting mechanism of the type having a member movable to select and establish different gear relations, fluid pressure-operated means for moving said member, means for controlling the flow of pressure fluid to said pressure-operated means including a pressure-responsive element movable to one of a plurality of positions in accordance with the pressure of the fluid supplied thereto, and preselective means operable to supply fluid pressure in predetermined steps to said element in accordance with the gear relation desired to set the same in one of said plurality of positions.

13. In a preselective gear shifting mechanism of the type having a member movable to select and establish different gear relations, fluid-operated means for moving said member, mechanism for controlling the flow of motive fluid to and from said fluid-operated means including means for moving the latter to gear-neutralizing position intermediate the shift from one gear relation to another, and means operable when said fluid-operated means reaches neutral position for conducting motive fluid to said controlling mechanism.

14. In a preselective gear shifting mechanism of the type having a plurality of members movable to establish different gear relations, fluid pressure-operated means for selecting and moving any one of said members to establish a desired gear relation, means associated with said last named means for moving the same to gear-neutralizing position upon exhausting of fluid pressure therefrom, valvular mechanism for controlling the flow of fluid pressure to and from said fluid pressure-operated means, a pre-settable selector member for operating said valvular mechanism, means for setting said selector member in accordance with the gear relation desired, valve means operable during movement of the selector member from one position to another for exhausting said fluid pressure-operated means through said valvular mechanism whereby said last named means is neutralized, and means operable when said fluid pressure-operated means is neutralized to conduct fluid pressure thereto through said valvular mechanism.

15. In a preselective gear shifting mechanism having a member movable laterally and longitudinally to select and establish different gear relations, a fluid motor for moving said member laterally, a fluid motor for moving said member longitudinally, valve means for controlling the flow of motive fluid to said first motor, valve means for controlling the flow of motive fluid to said second motor, a pressure responsive member for moving said first valve means in advance of said second valve means, and means for conducting fluid pressure to said member.

16. In combination with a motor vehicle including a clutch and a transmission provided with shifting means, a gear shifting assembly comprising power means operative for moving said shifting means selectively to a plurality of operative positions, control mechanism including a plurality of control devices for rendering said power means operative, fluid pressure means for selectively actuating said control devices, and means operative upon disengagement of the clutch for rendering said control mechanism operative.

17. A gear shifting mechanism for a motor vehicle having a transmission provided with shifting means, comprising differential pressure power means for moving said shifting means, control valve mechanism for establishing pressure differentials in said power means for moving said shifting means selectively to a plurality of operative positions, fluid pressure means for actuating said control valve mechanism, and fluid pressure means cooperating with said control valve mechanism for stopping said power means with said shifting means in neutral position.

18. In combination with a motor vehicle having an H-type transmission, a gear shifting assembly comprising power means for effecting movement of the transmission elements from low gear position to high gear position, a plurality of control means for said power means, common pneumatic actuating means for said control means, and a manual selector for said pneumatic actuating means.

19. In combination with a motor vehicle including a clutch and a transmission provided with shifting means, a gear shifting assembly comprising power means operative for moving said shifting means selectively to a plurality of operative positions, control mechanism including a plurality of control devices for rendering said power means operative, fluid pressure means for selectively actuating said control devices, manually operable means for controlling said fluid pressure means, and means operative upon disengagement of the clutch for rendering said control mechanism operative.

20. In combination with a motor vehicle having an H-type transmission, a gear shifting assembly comprising power means for effecting movement of the transmission elements from low gear position to high gear position, a plurality of control means for said power means, common pneumatic actuating means for said control means, and means for supplying said actuating means with different fluid pressures for each different gear position desired including a manually operable selector valve.

WILFRED A. EATON.
ROY S. SANFORD.